March 16, 1926.
A. J. SINCLAIR
SHOCK ABSORBER
Filed August 21, 1925
1,577,377
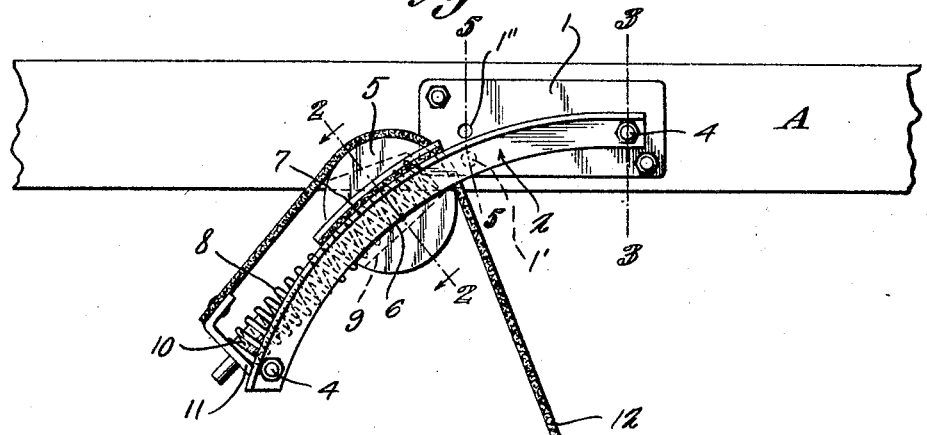
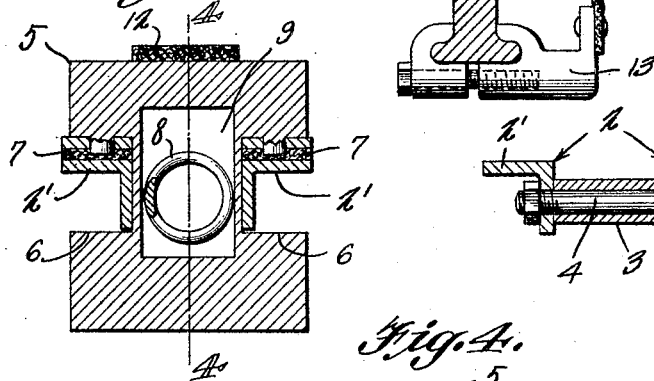
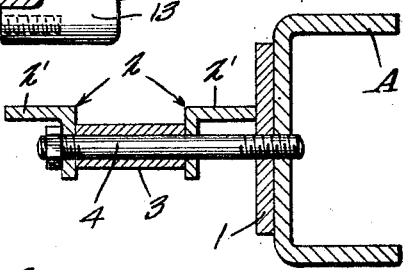
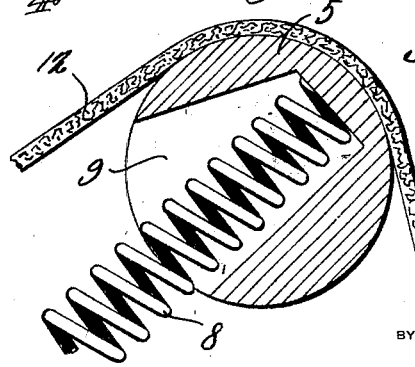
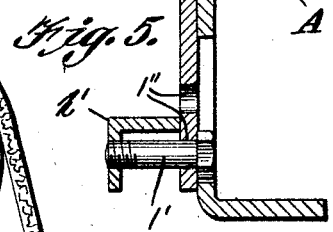
Alfred J. Sinclair, INVENTOR
BY Victor J. Evans, ATTORNEY
WITNESS: P. T. Hickey Patented Mar. 16, 1926.

1,577,377

UNITED STATES PATENT OFFICE.

ALFRED J. SINCLAIR, OF DAYTON, OHIO.

SHOCK ABSORBER.

Application filed August 21, 1925. Serial No. 51,663.

*To all whom it may concern:*

Be it known that I, ALFRED J. SINCLAIR, a citizen of the United States, residing at Dayton, in the county of Montgomery and State of Ohio, have invented new and useful Improvements in Shock Absorbers, of which the following is a specification.

This invention relates to a shock absorber for motor vehicles and the like, the general object of the invention being to provide a movable member, the movement of which is resisted by spring means and brake means with a flexible member passing over the aforesaid member and connected to the parts of the vehicle or other device, the relative movement of which is to be controlled.

Another object of the device is to so arrange the parts that the braking action will increase as the movable member is brought into action.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a detail view showing the invention applied to a vehicle.

Figure 2 is a section on line 2—2 of Figure 1.

Figure 3 is a section on line 3—3 of Figure 1.

Figure 4 is a section on line 4—4 of Figure 2.

Figure 5 is a section on line 5—5 of Figure 1.

In these views, A indicates a part of the frame of a vehicle and B one of the axles thereof. In carrying out my invention, I bolt a plate 1 to the frame A and fasten to this plate a track 2 which consists of a pair of curved angle bars 2' which are held in spaced relation by the spacers 3 on the bolts 4 which connect the bars together at their ends. The track curves downwardly, as shown in Figure 1 and a roller-like member 5 has its ends recessed, as at 6, to receive the bars 2' of the track. Thus the member 5 is slidably mounted on the track but movement thereon is resisted by the brake bands 7 fastened to the upper walls of the recesses 6 and engaging the upper flanges of the bars 2' of the track and also by the coiled spring 8 which has one end engaging a socket 9 in the member 5 and its other end engaging a bearing 10 carried by an upright 11 which is fastened to the lower end of the track. This spring tends to hold the member 5 at the upper end of the track. A flexible member 12 is fastened to the upper part of the piece 11 and passes over the member 5 and is connected to a clamp 13 which engages the axle B.

From the foregoing, it will be seen that the member 5 acts as a brake drum and the parts are so arranged that said member 5 will normally occupy a position midway the ends of the track when the vehicle parts are in normal position, as shown in Figure 1.

On the rebound of the springs of the vehicle, the frame A rises so that a pull is exerted upon the flexible member 12 which in turn exerts a downward pressure on the member 5, but the movement is resisted by the brake shoes and by the spring 8. Thus the recoil is checked, so that the body of the vehicle rises slowly until the member 5 reaches a middle position, and then the pressure of the brake shoes on the track becomes less so that the body gradually assumes its normal position with the drum 5 in its middle position. The action of the device is differential in its travel and the entire device acts as an automatic brake for the upward movement of the body, the brake having the most power when the body is all the way down. This device will not affect the car springs and the car will ride normally as if the shock absorbers were absent.

Attention is called to the fact that the drum and brake shoes slide loosely on the bars or track and when the strain comes on the strap, the brake shoes are pressed firmly on the bars and the brake is dragged along the surface of the bars, thus resisting the upward movement of the body of the vehicle. At the beginning of the movement, with the drum at the top of the track, where the curve is more at right angles with the strap, the friction is greatest. Then the friction gradually decreases as the drum moves down, due to the curvature of the bars being more close to the vertical. Thus the device has the most resistance to the upward movement of the car body when the car body is in its lowest position, and then the resistance gradually lessens as the body moves upwardly on the rebound.

In order to permit the device to be adjusted to suit different types of cars or vehicles, I provide a bolt 1' which is adapted to be placed in any one of a number of holes 1'' in the plate 1, this bolt engaging the inner bar of the curved track. Thus the curature of the track can be adjusted to increase or diminish the resistance of the brake on the track to suit the vehicle on which the device is used.

While the member 12 is shown as a strip of webbing, it will, of course, be understood that this could be made of any suitable material and in any desired manner, so that it is flexible enough to travel over the drum.

When the car body is in its lowest position with its springs fully compressed, the member 5 will be forced by the spring 8 to the upper end of the track.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described, comprising a curved track, a drum, brake parts carried by the same and engaging the track, spring means for normally holding the drum at the upper end of the track and a flexible member passing over the drum and having its ends connected with the parts, the relative movements of which are to be resisted.

2. A shock absorber of the class described, comprising a curved track member, a drum member thereon, brake shoes for resisting relative movement of the members, one member being movable in relation to the other and a flexible member passing over the drum member and connected with the parts, the relative movement of which is to be checked.

3. A shock absorber for a vehicle, comprising a curved track adapted to be connected with a part of the body of the vehicle, a drum on the track, brake shoes on the drum engaging the track, a spring for holding the drum at the top end of the track and a flexible member passing over the drum and having one end connected with the lower end of the track and its other end with a part of the running gear of the vehicle.

In testimony whereof I affix my signature.

ALFRED J. SINCLAIR.